United States Patent [19]

Bjork et al.

[11] Patent Number: 4,626,652
[45] Date of Patent: Dec. 2, 1986

[54] METHOD AND MEANS OF REMOVING CLADDINGS FROM OPTICAL FIBERS

[75] Inventors: Paul E. Bjork, Minneapolis, Minn.; Gordon L. Mitchell, Woodinville, Wash.; Hans W. Mocker, Minneapolis, Minn.

[73] Assignee: Honeywell Inc., Minneapolis, Minn.

[21] Appl. No.: 714,428

[22] Filed: Mar. 21, 1985

[51] Int. Cl.[4] ............................................. B23K 26/00
[52] U.S. Cl. .................... 219/121 LH; 219/121 LJ; 219/121 LS; 219/121 LF; 350/96.29; 350/96.33
[58] Field of Search ............... 219/121 LH, 121 LJ, 219/121 LT, 121 LS, 121 LE, 121 LF, 121 L, 121 LM; 350/96.29, 96.33, 96.15

[56] References Cited

U.S. PATENT DOCUMENTS

| | | | |
|---|---|---|---|
| 3,700,850 | 10/1972 | Lumley et al. | 219/121 LJ |
| 4,021,097 | 5/1977 | McMahon | 350/96.15 |
| 4,054,366 | 10/1977 | Barnoski et al. | 350/96.15 |
| 4,312,562 | 1/1982 | Segawa et al. | 350/96.29 X |
| 4,386,822 | 1/1983 | Bergh | 350/96.15 |
| 4,387,954 | 1/1983 | Beasley | 350/96.15 |
| 4,461,536 | 7/1984 | Shaw et al. | 350/96.29 |
| 4,476,512 | 10/1984 | Sunago et al. | 219/121 LB X |
| 4,504,727 | 3/1985 | Melcher et al. | 219/121 LB |

FOREIGN PATENT DOCUMENTS

| | | | |
|---|---|---|---|
| 0065400 | 5/1977 | Japan | 219/121 LB |
| 0179586 | 10/1983 | Japan | 219/121 LJ |
| 0120391 | 7/1984 | Japan | 219/121 LB |

OTHER PUBLICATIONS

W. Eickhoff article, In-Line Fiber-Optic Polarizer, Electronics Letters 16, pp. 762-763, 1980.

Primary Examiner—C. L. Albritton
Attorney, Agent, or Firm—William T. Udseth

[57] ABSTRACT

An optical fiber is processed by ablating cladding material with an intense electromagnetic energy source. The intensity of another beam directed along the propagation axis of the fiber is monitored to detect near exposure of the fiber core. The ablating electromagnetic energy source is preferably circularly polarized. Apparatus for performing this process is disclosed. Fibers produced by this process are used to form optical couplers or, when a metallic layer is provided over the nearly exposed core region, an optical polarizer.

20 Claims, 9 Drawing Figures

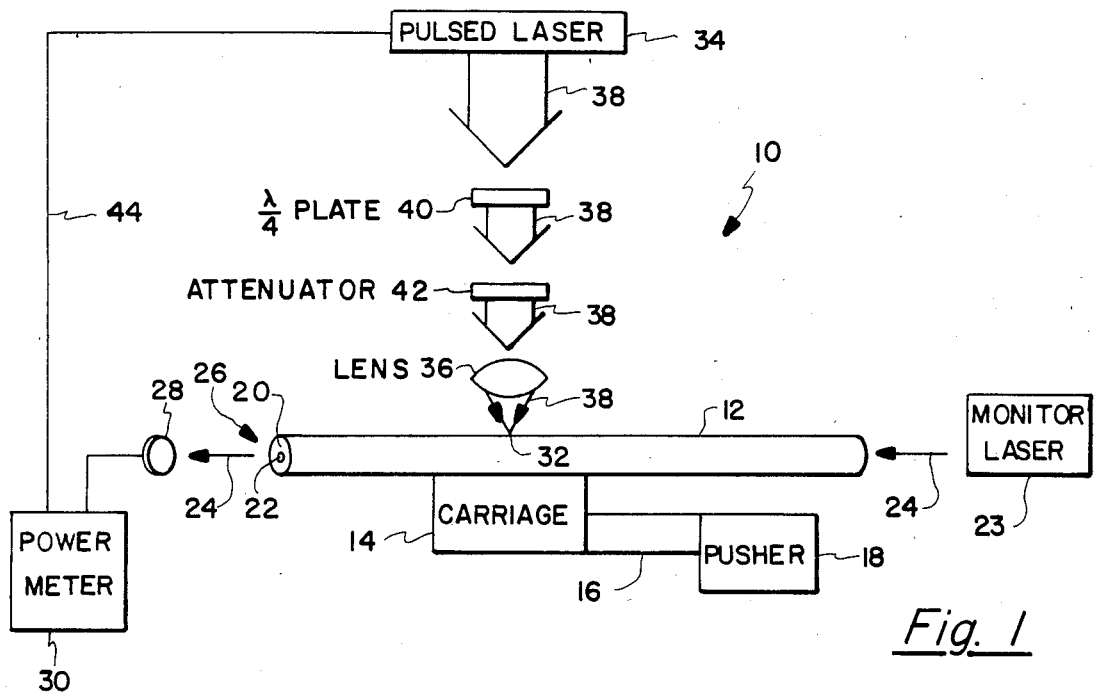
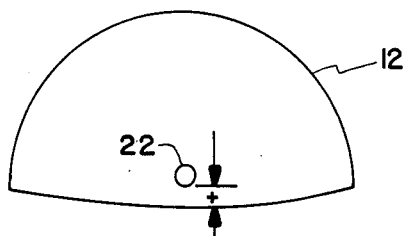
Fig. 2a
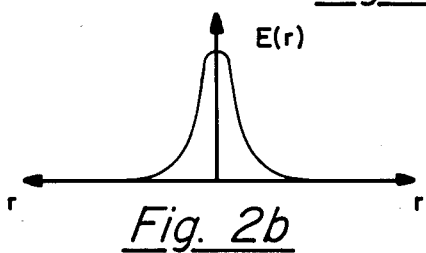
Fig. 2b
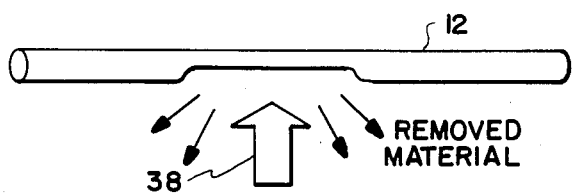
Fig. 4a - ABLATE FIBER MATERIAL
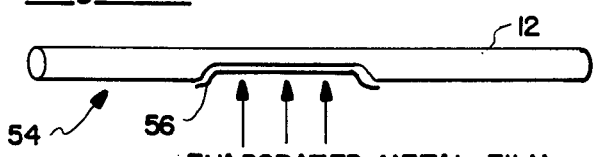
Fig. 4b - PLATE FIBER
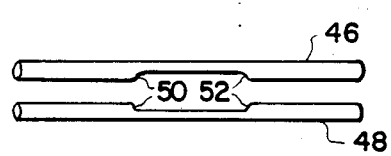
Fig. 3a - REMOVE CLADDING
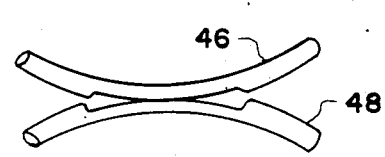
Fig. 3b - CONTACT
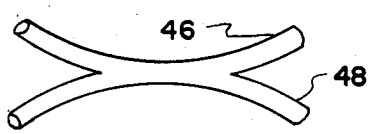
Fig. 3c - HEAT AND FUSE

METHOD AND MEANS OF REMOVING CLADDINGS FROM OPTICAL FIBERS

BACKGROUND OF THE INVENTION

1. Field of the Invention

This invention relates to methods and means of ablating the cladding of an optical fiber by using high energy electromagnetic beams such as lasers. Fiber optic couplers and fiber optic polarizers are formed with fibers subjected to this process.

2. Prior Art

Several techniques have been used to remove or reduce the dimensions of the cladding material covering optical fibers as one step in the production of fiber optic couplers. The optical fiber are typically about one hundred microns in diameter with a five or six micron diameter core.

The most common techniques are acid etching, grinding (or lapping) and fusing. In the acid etch technique, two or more optical fibers are twisted together. The fibers are placed in an acid bath until the claddings are etched away thus placing the core regions in close proximity. The twisted fibers are then immersed in index matching liquids so that light from one fiber can more easily enter surrounding cores.

In the grinding method, a fiber is fixed in a groove cut in a holding block. The fiber is arched so that the portion of the cladding to be removed is raised above the surface of the holding block. Typically abrasives or pastes are then employed to grind away the raised cladding and expose the core.

Two fibers prepared by grinding are placed together with the cores in close proximity to form a coupler. Index matching fluid or adhesive is sometimes used as a thin layer between cores.

In the fusing method, two fibers are pressed together and a portion of the combination is heated to melt the cladding material. The fibers are stretched when hot until the core regions are in close proximity. U.S. Pat. No. 4,054,366 issued to Barnoski, et al discloses fusing where a $CO_2$ laser is used to melt the cladding.

All of the above methods have drawbacks. All are labor intensive and traditionaly low yield. In addition to requiring the handling of corrosives, the acid etch technique produces an end product which cannot be readily integrated in fiber optic systems.

Grinding can produce very flat surfaces but at very high cost. Further, couplers produced with fibers made by the grinding method have thermal expansion problems. A coolant is flowed over the fibers as grinding occurs. The coolant causes the growth of micro-cracks in the fiber and if the fiber is removed from the holding block, the fiber could break. Therefore the fiber is left in the holding block and the coupler formed with the holding blocks attached. The blocks are typically metal or some other material with a coefficient of thermal expansion which is different from that of the optical fiber. In operation, the different coefficients of thermal expansion can affect the relative position of the coupled fibers and thus the amount of light coupled.

Further, if a layer of refractive index matching fluid is used between cores, the fluid will usually have a different thermal coefficient of refractive index than the ground fibers. This in turn provides another source of coupling instability due to mismatched thermal coefficients.

With fused fibers, the stretching is extensive and reduces the core diameter as well as the outside diameter of the fiber. This causes a broadening of any lightwave which propogates along the core. Significant radiation loss can occur from a fiber with such reduced core dimensions. In practice it is very difficult to control the stretching to obtain the desired coupling without suffering significant radiation loss in the coupling region.

Another device which employs optical fibers having a portion of the cladding removed to expose the core is a fiber optic polarizer. A fiber optic polarizer where a thin metallic film is formed on an exposed core portion of the optical fiber is disclosed in "In-Line Fiber Optic Polarizer", W. Eickhoff, Electronic Letters 16, page 762–763 (1980).

The fiber in the polarizer described by Eickhoff was prepared by grinding. This left a fiber with a curved base surface which hinders in line processing of long lengths of the fiber. If longer lengths could be readily processed, the region effecting polarization could be increased thus yielding larger degrees of polarization.

SUMMARY OF THE INVENTION

The present invention is a method of removing a portion of the exterior (i.e., cladding) material of an optical fiber to nearly expose the core region. The method includes the steps of transmitting a monitor electromagnetic energy beam along the fiber core, directing an ablating beam of electromagnetic energy onto the cladding wherein the ablating beam has sufficient energy to remove some of the cladding, monitoring the intensity of the monitor beam and removing the ablating beam when sufficient variation occurs in the intensity of the monitoring beam to indicate that the core is nearly exposed. Apparatus for accomplishing the method is also disclosed.

The present invention includes a method of forming a coupler with two fibers processed as described above. The cores of the two fibers are placed in close proximity with a brief fusing step employed to join fibers.

The present invention also includes a method of forming a polarizer with a single fiber processed as first described above, and with a thin metallic film evaporated onto the nearly exposed core region.

BRIEF DESCRIPTION OF THE DRAWINGS

FIG. 1 is a schematic of an apparatus according to the present invention which performs the process of the present invention.

FIG. 2a is a typical cross section of a fiber processed according to the present invention.

FIG. 2b is a typical cross sectional energy distribution of energy propagating along the core of a fiber.

FIGS. 3a, 3b and 3c illustrate steps in forming a coupler with fibers processed according to the present invention.

FIGS. 4a and 4b illustrate steps in forming a polarizer with a fiber processed according to the present invention.

DESCRIPTION OF THE PREFERRED EMBODIMENT

Figure 5:
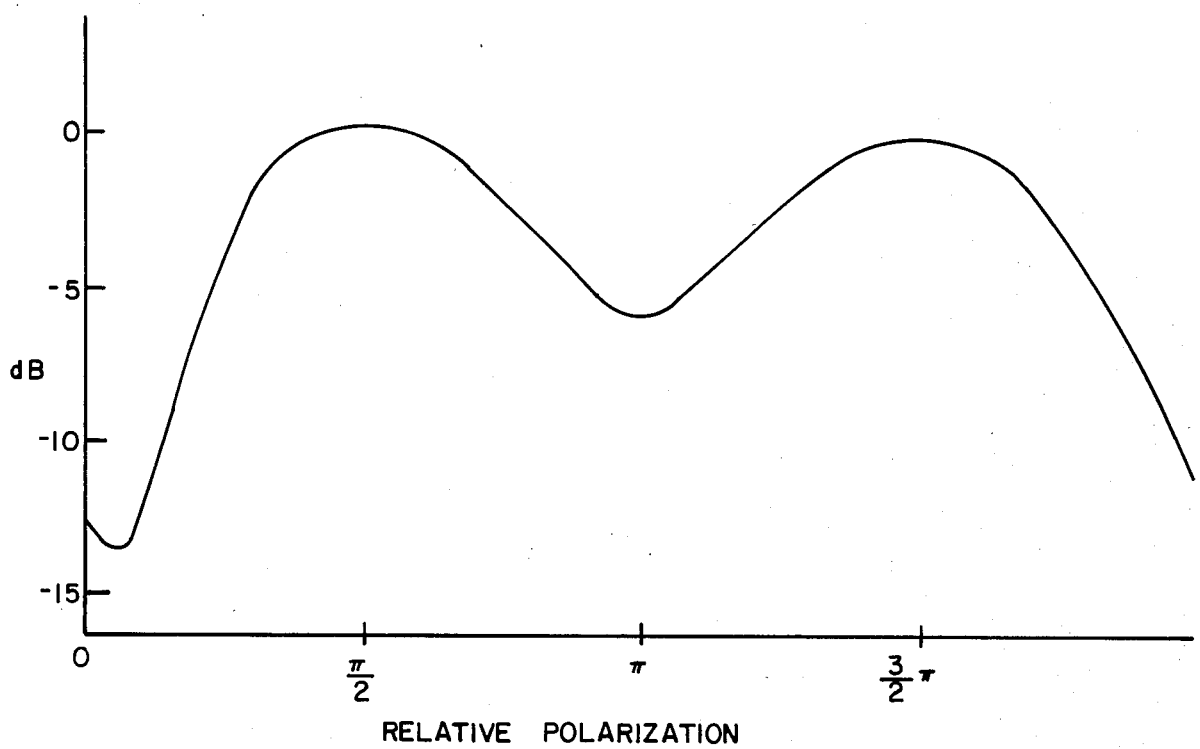
FIG. 5 is a graph of the polarization sensitivity of a fiber polarizer made with a fiber processed according to the present invention.

FIG. 1 depicts an apparatus 10 for performing the process of the present invention. Optical fiber 12 rests on a carriage 14 which is adapted to move along the direction of fiber 12. Armature 16 engages carriage 14, and a means for moving armature 16, such as an electric motor or pusher 18, reciprocates armature 16 and carriage 14. Fiber 12 has a cladding region 20 and a core 22, with the index of refraction of the core region being greater than that of the cladding.

A low intensity electromagnetic energy source (such as monitor laser 23) is adapted to transmit electromagnetic energy (i.e., beam 24) in the core 22 of fiber 12. This of course entails a source 23 which emits at least one wavelength which can propogate along fiber 12 in at least one mode. A means for monitoring the intensity of the electromagnetic energy coming out of fiber 12 (at end 26) is conveniently provided by the detector 28 and power meter 30.

A pulsed source of electromagnetic energy having sufficient energy to ablate the cladding at a point 32 on fiber 12 is provided conveniently by laser 34. This requires source 34 to emit a wavelength which is strongly absorbed by fiber 12 and is not propogated by it. If fiber 12 normally propogates the energy from source 34, fiber 12 could be treated or coated with a substance, such as a dye, which absorbs energy from source 34. In order to achieve a sufficient concentration of energy, optics (such as lens 36) may be employed to focus beam 38 from laser 34 on point 32.

As will be explained further below, circularly polarized electromagnetic energy is preferable as the ablation energy. Thus, FIG. 1 shows a quarter waveplate 40 in the path of linearly polarized beam 38. Attenuator 42 may be employed to vary the intensity of the particular energy source 34.

In operation apparatus 10 reciprocates fiber 12 in a direction parallel to its longitudinal axes by activating pusher 18. Monitor source 23 transmits electromagnetic energy along fiber 12 and illuminates detector 28. A pre-ablation power level is registered on meter 30. Source 34 is energized and point 32 is irradiated. The intensity of beam 38 at point 32 is selected to be sufficient to ablate the exterior cladding at point 32. The cladding is literally vaporized.

The reciprocating motion of fiber 12 allows point 32 to scan back and forth along a region of fiber 12. Scanning allows removal of cladding 20 in layers and increases the smoothness of the final surface. Ablation is preferably terminated near the interface of cladding 20 and core 22. Once core 22 is nearly exposed a sharp decrease will occur in the electromagnetic energy irradiating detector 28 due to an increase in the electromagnetic energy lost at this point.

A feedback signal can be transmitted from power meter 30 along line 44 to laser 34 to shut laser 34 off when the core is nearly exposed at point 32, or a short time thereafter to allow completion of a scan which would nearly expose a desired length of core 22.

The process described above is a typical operational example of apparatus 10. It can be modified in many ways. Fiber 12 need not of course be moved in a reciprocating manner. The cladding 20 can be removed to the near core 22 at the first point 32 with fiber 12 then being moved to a second point (not shown) and the cladding removed to near the core at the second point. Fiber 12 can be coiled or elongated. The ablation source should be pulsed to prevent deep melting of fiber 12. The loss due to the ablation process can be monitored in various ways. Fiber 12 can be a single mode or a multimode fiber. If fiber 12 is a single mode fiber, it is preferable to provide a single mode monitor source 23.

Ablation should be stopped before reaching the core in order to preserve the low-loss waveguide properties of the core. Evanescent fields of the core guided energy extend significantly into the cladding region 20. Ablation should be terminated when a small portion of the evanescent fields are coupled out through the remaining cladding. A 0.1 dB to 0.3 dB loss will indicate that about 5 microns of cladding will remain above the core 20 and will generally be a good time to terminate ablation.

If one desires more energy to be coupled out, it is preferable to extend the length of the ablated region rather than cut to less than 5 microns from the core.

The general cross section of a fiber 11 with a portion of cladding 20 ablated by the above process is shown in FIG. 2a. Typically fiber 12 is about 100 micons in diameter and the core region is about 6 microns in diameter. About 5 microns is shown as the thickness "t" of the cladding 20 remaining above core 22 in the ablated region.

The energy distribution of FIG. 2b show the intensity to be about 50% of peak value at the core edge. The tails of the distribution typically contain insignificant energy beyond a radius of about 15 microns.

One example of the ablation technique is as follows: A $CO_2$ pulsed TEA (transverse excited atmospheric) laser was used as source 34. Its pulse width was 50 nanoseconds, pulse energy 60 millijoules, peak power 0.5 megawatts, power density 6.4 gigawatts/square centimeter and repetition rate 1.9 Hz. A quarter waveplate 40 was employed with its principal axes at 45° with respect to the polarization of beam 38. Attenuator 42 was a potassium salt crystal which provided attenuation of 1/2.35. Laser 34 was operated at about 23 kV. The focused spot of beam 38 was 100 microns (gaussian halfwidth) and it was formed with a spherical convex lens as lens 36. Scanning was performed in a reciprocating manner with a fiber scanning speed of 37 microns per second. The fiber was silica, 120 microns in diameter with a core of 8 microns. Seventeen passes (i.e., two passes returns one to the start point) along the ablation region where performed before a 0.3 dB loss in intensity of the monitor beam was observed. Pusher 20 was a Burleigh 555 pusher. Detector 28 was a silicon photodiode. Detector 28 and meter 30 are preferably sensitive to milliwatt variations.

The power density of the ablating electromagnetic energy source 34 should be carefully controlled for optimum results. A power density of 6.4 gigawatts/square centimeter plus or minus 30%, is the preferred range of power densities. Operation of the ablation source at or very near 6.4 gigawatts/square centimeter yielded the best results for typical silica fibers.

Various focusing means can be used in place of lens 36. If a cylindrical lens is used as lens 36, it produces a long and narrow beam spot which can conveniently be aligned along the propogation axes of fiber 12.

Circularly polarized light was used in the above example because it eliminated a ripple which appeared on the surface after ablation when linearly polarized light was used.

An optical coupler can be formed from two fibers 46 and 48 (see FIG. 3) processed as described above. FIG. 3 shows three steps in the formation of a coupler. In FIG. 3a, the processed fibers 46 and 48 are positioned with the nearly exposed core regions oppositely disposed (note the shoulders 50 and 52 characteristic of this process). In FIG. 3b fibers 46 and 48 are flexed so that the nearly exposed core regions are placed in physical contact. In FIG. 3c, the fibers are heated and fused. In practice a continuous wave $CO_2$ laser or an oxyacetylene flame was used as the heat source for fusing. Note that in FIG. 3, the drawings are shortened along the fiber axial direction to emphasize the cladding removal.

One method of performing the fusion is to press the fibers together as fibers 46 and 48 are heated to near their melting points. The fibers are then stretched so that the ablated region is expanded in length about 5 or 10 percent.

In one example stretching was performed by using micrometers to pull the fibers and the output of the fibers was monitored until the desired ratio of power division was obtained along the coupler branches. A 5 db loss of total power was observed in a coupler formed as described. Coupler performance can possibly be improved by modifying the ablation process by slowing the scanning speed and/or reducing the ablation source power. Stretching is not required to form a coupler but in some cases slight stretching may be a convenient method of achieving the desired coupling.

FIG. 4 depicts another structure, a polarizer 54, which can be readily fabricated from a fiber ablated by the process of the present invention. A thin metal layer 56 is formed (by standard techniques such as evaporation) on the surface of the ablated region.

FIG. 5 depicts data taken on a polarizer such as polarizer 54. The data shows the sensitivity of the output of the fiber to the linear polarization of light propagating along the fiber relative to the surface of metallic layer 56. Light with an electric vector parallel to the surface of metal layer 56 experienced an increased loss of at least 5 db compared to light having an electric vector perpendicular to the surface of metallic layer 56.

The data in FIG. 5 was derived from a polarizer with an ablated region 3 mm long. The fiber itself was an AMFOX 3010 single mode fiber with a maximum attenuation of 11.7 dB/km at 632.8 mm. The cutoff wavelength was 610 nm, the numerical aperture was 0.079, the core diameter was 5.9 microns and the outside diameter was 100 microns. The ablated region was produced by apparatus 10 of FIG. 1 with five passes of the ablation source at 30 sec/pass. The fiber was pulsed in an evacuated chamber with only the ablated region exposed and approximately 2140 Å of an aluminum - tungsten mixture was evaporated onto the ablated region. A Coherent model 2000 single mode linearly polarized HeNe laser was aligned at 45° with respect to the surface of the metal so that equal amounts of light were both parallel and perpendicular to the metal. The null at $\pi$ in FIG. 5 would probably approach the other null if the laser alignment were exactly 45° and the polarization of the light was constant as the light travelled down the fiber.

What is claimed is:

1. A method of removing a portion of the exterior layer of an optical fiber to nearly expose the core region, wherein said optical fiber is capable of transmitting at least one mode of electromagnetic energy along said core, comprising:
   transmitting a first beam of electromagnetic energy along said core;
   directing a second beam of electromagnetic energy onto said portion of said exterior layer, said second beam having sufficient intensity to ablate at least some of said exterior layer;
   monitoring the intensity of said first beam at a location on said fiber, wherein said portion of said exterior layer is between said location and the source of said first beam; and
   removing said second beam from said portion of said exterior layer when a sufficient variation occurs in the intesity of said first beam at said location to indicate that said core is nearly exposed.

2. The method of claim 1 wherein said first and second beams are laser beams.

3. The method of claim 1 wherein said fiber is a single mode optical fiber.

4. The method of claim 1 wherein said second beam is a $CO_2$ TEA laser beam.

5. The method of claim 1 wherein said fiber is a multimode fiber.

6. The method of claim 1 wherein sufficient variation occurs when a 0.1 to 0.3 dB drop in intensity of said first beam is detected.

7. The method of claim 2 wherein said first beam has a pulse width of less than 1 microsecond.

8. The method of claim 1 further including repeatedly scanning said second beam along said exterior layer so that said ablated material is removed in layers.

9. The method of claim 1 further including circularly polarizing said second beam prior to said second beam irradiating said exterior layer.

10. A method of making a fiber optic coupler having first and second optical fibers, wherein said optical fibers each have a cladding material, a core and are capable of transmitting at least one mode of electromagnetic energy along said core, comprising:
    transmitting a first beam of electromagnetic energy along the core of said first fiber;
    directing a second beam of electromagnetic energy onto a portion of the cladding of said first fiber, said second beam having sufficient intensity to ablate at least some of the cladding of said first fiber;
    monitoring the intensity of said first beam at a location on said first fiber wherein said portion of the cladding of said first fiber is between said location and the source of said first beam;
    removing said second beam from the portion of the cladding of said first fiber when a sufficient variation ooours in the intensity of said first beam to indicate that the core of said first fiber is nearly exposed:
    repeating the above steps for said second fiber;
    placing the exposed core regions of said first and second fibers in close proximity:
    heating said exposed core regions to temperatures near the melting point of said first and second fibers; and
    pulling on said first and second fibers as they are heated until the desired power division is achieved between said first and second fibers.

11. A method of making a fiber optic polarizer, wherein said optical fiber has a cladding, a core and is capable of transmitting at least one mode of electromagnetic energy along said core, comprising:
    transmitting a first beam of electromagnetic energy along said core:
    directing a second beam of electromagnetic energy onto a portion of said cladding, said second beam having sufficient intensity to ablate at least some of said cladding;
    monitoring the intensity of said first beam at a location on said fiber wherein said portion of said cladding is between said location and the source of said first beam;

removing said second beam from said portion of said cladding when a sufficient variation occurs in the intensity of said first beam to indicate that said core is nearly exposed; and forming a thin metallic film on said portion of said cladding.

12. An apparatus for removing a portion of an exterior layer of an optical fiber to nearly expose the core region, wherein said optical fiber is capable of transmitting at least one mode of electromagnetic energy along said core, comprising:

a first source of electromagnetic energy adapted to transmit a first beam along said core;

a second source of electromagnetic energy adapted to direct a second beam of electromagnetic energy onto said portion of said exterior layer, said second beam having sufficient intensity to ablate some of said exterior layer;

means for monitoring the intensity of said first beam at a location on said fiber wherein said portion of said exterior layer is between said monitor location and said first source; and means for removing said second beam from said portion of said exterior layer when a sufficient variation occurs in the intensity of said first beam to indicate that said core is nearly exposed.

13. The device of claim 12 wherein said first and second sources of electromagnetic energy are laser beams.

14. The apparatus of claim 12 wherein said fiber is single mode fiber.

15. The apparatus of claim 12 wherein said fiber is a multimode fiber.

16. The apparatus of claim 12 wherein said means for removing said second beam is adapted to remove said second beam when a 0.1 to 0.3 dB drop in intensity of said first beam occurs.

17. The apparatus of claim 13 wherein said first beam has a pulse width of less than 1 microsecond.

18. The apparatus of claim 12 further including means for repeatedly scanning said second beam along said exterior layer so that said ablated material is removed in layers.

19. The apparatus of claim 12 wherein said second beam is circularly polarized.

20. A method of making a fiber optic coupler having first and second optical fibers, wherein said optical fibers each have a cladding material, a core and are capable of transmitting at least one mode of electromagnetic energy along said core, comprising:

transmitting a first beam of electromagnetic energy along the core of said first fiber;

directing a second beam of electromagnetic energy onto a portion of the cladding of said first fiber, said second beam having sufficient intensity to ablate at least some of the cladding of said first fiber;

monitoring the intensity of said first beam at a location on said first fiber wherein said portion of the cladding of said first fiber is between said location and the source of said first beam;

removing said second beam from the portion of the cladding of said first fiber when a sufficient variation occurs in the intensity of said first beam to indicate that the core of said first fiber is nearly exposed;

repeating the above steps for said second fiber;

placing the nearly exposed core regions of said first and second fibers in close proximity; and heating said exposed core regions to temperatures near the melting point of said first and second fibers.

* * * * *